(12) United States Patent
Nakano et al.

(10) Patent No.: US 9,607,305 B2
(45) Date of Patent: Mar. 28, 2017

(54) INSPECTION APPARATUS

(71) Applicant: Kabushiki Kaisha Toshiba, Tokyo (JP)

(72) Inventors: Takahisa Nakano, Kanagawa (JP); Tsutomu Saito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 14/633,908

(22) Filed: Feb. 27, 2015

(65) Prior Publication Data

US 2015/0254678 A1 Sep. 10, 2015

(30) Foreign Application Priority Data

Mar. 4, 2014 (JP) .................. 2014-042149

(51) Int. Cl.
| | |
|---|---|
| *G06Q 30/00* | (2012.01) |
| *G07D 7/12* | (2016.01) |
| *G06K 9/46* | (2006.01) |
| *H04N 7/18* | (2006.01) |

(52) U.S. Cl.
CPC ....... *G06Q 30/0185* (2013.01); *G06K 9/4661* (2013.01); *G07D 7/121* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 4,723,072 A | 2/1988 | Naruse | |
| 6,473,165 B1 * | 10/2002 | Coombs | G07D 7/121 356/71 |
| 7,778,540 B2 | 8/2010 | Miyazaki et al. | |
| 2005/0129282 A1 | 6/2005 | O'Doherty et al. | |

(Continued)

FOREIGN PATENT DOCUMENTS

JP 2006-350995 A 12/2006

OTHER PUBLICATIONS

Extended European Search Report issued in related European Application No. EP151522422, issued on Jul. 14, 2015 (7 pages).

*Primary Examiner* — Bhavesh Mehta
*Assistant Examiner* — Narek Zohrabyan
(74) *Attorney, Agent, or Firm* — Baker Botts L.L.P.

(57) ABSTRACT

According to one embodiment, an inspection apparatus includes an optical system portion on which a plurality of reflected light rays corresponding to a plurality of observation directions with respect to an optical variable image device are incident and which images the plurality of reflected light rays incident thereon, an imaging portion that images the plurality of reflected light rays imaged by the optical system portion and thereby generates reflected light images corresponding the plurality of respective observation directions, an object relation determination portion that determines whether or not there is a predetermined geometric difference between objects that are contained in reflected light images imaged by the imaging portion and corresponding to different observation directions, and an authenticity (Continued)

determination portion that determines authenticity of the optical variable image device based on a result of the determination by the object relation determination portion.

8 Claims, 15 Drawing Sheets

(56) References Cited

U.S. PATENT DOCUMENTS

2007/0279515 A1* 12/2007 Miyazaki .................. G03H 1/22
                                                          348/341
2011/0317150 A1* 12/2011 Decoux .............. G06K 7/10722
                                                           356/73

* cited by examiner

| RELATION CORRESPOINDING TO OBJECTS | GEOMETRIC DIFFERENCES |
|---|---|
| #1 : #2 | ROTATION : +β |
| #1 : #3 | ROTATION : -β |

FIG. 5

| RELATION CORRESPOINDING TO OBJECTS | GEOMETRIC DIFFERENCES |
|---|---|
| #1 : #2 | MOVEMENT : x = +d, y = 0 |
| #1 : #3 | MOVEMENT : x = -d, y = 0 |

FIG. 9

| RELATION CORRESPOINDING TO OBJECTS | GEOMETRIC DIFFERENCES |
|---|---|
| #1 : #2 | SCALING : e1 |
| #1 : #3 | SCALING : e2 |

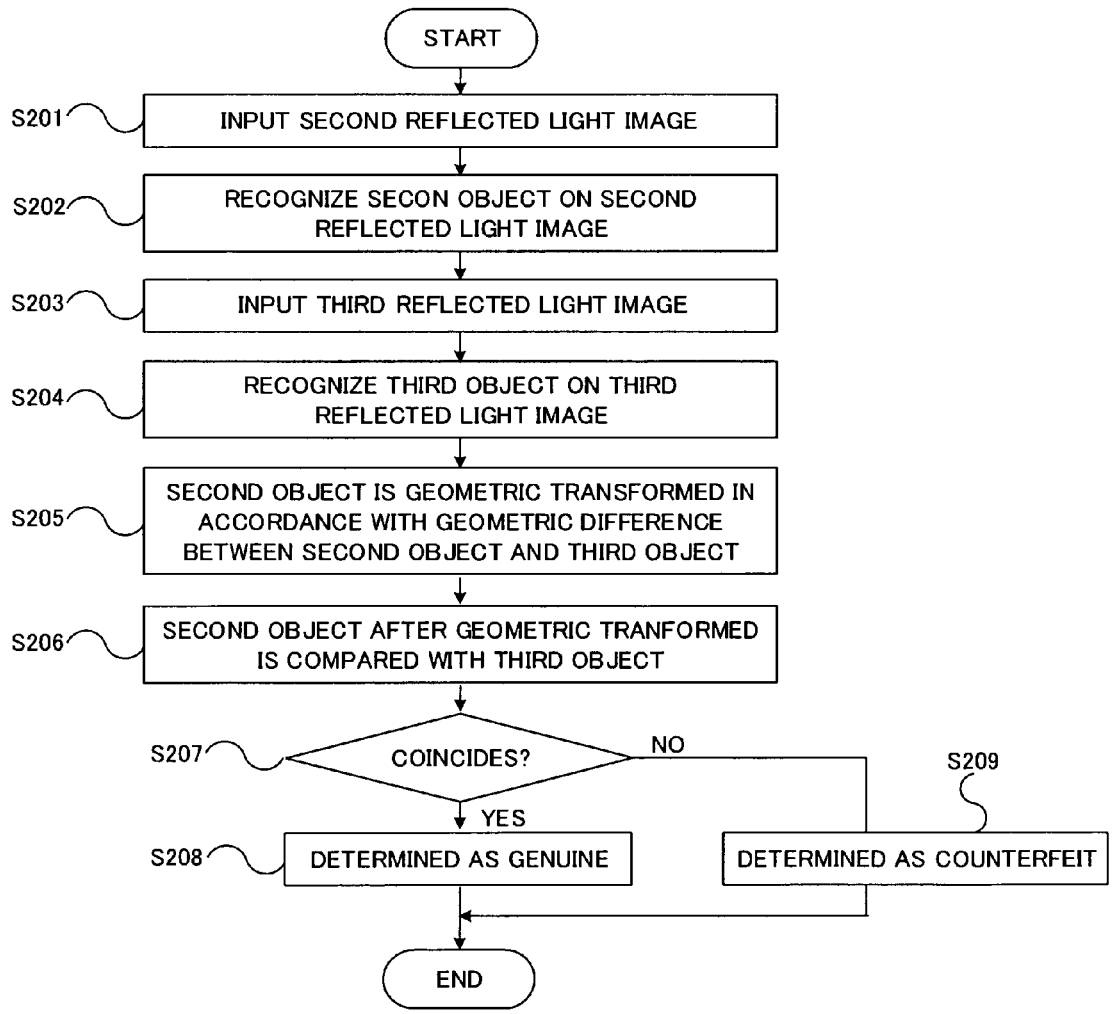

INSPECTION APPARATUS

CROSS-REFERENCE TO RELATED APPLICATION

This application is based upon and claims the benefit of priority from Japanese Patent Application No. 2014-042149, filed on Mar. 4, 2014; the entire contents of which are incorporated herein by reference.

FIELD

Embodiments described herein relate generally to an inspection apparatus.

BACKGROUND

There are cases where securities and the like are provided with an optical variable image device in order to counteract fraud such as counterfeiting. An optical variable image device is a device with which different images are observable from different observation directions. For example, a hologram is one type of optical variable image device.

An inspector observes an optical variable image device provided on a security to be inspected from a plurality of predetermined observation directions and checks whether each of the viewed images is correct. If the individual images are correct, the inspector determines that the optical variable image device is genuine, and accordingly the security provided with that optical variable image device is also genuine. On the other hand, if at least one of the images is not correct, the inspector can determine that the optical variable image device is a counterfeit, and accordingly the security provided with that optical variable image device is also a counterfeit.

As described above, optical variable image devices have a property of allowing different images to be viewed from different observation directions, and can therefore effectively prevent counterfeiting by copying and other techniques in which light is irradiated from only one direction. However, this property of the optical variable image devices also makes it difficult to process an image observed from an optical variable image device as machine-readable information. For this reason, there are cases where it is difficult to perform authenticity determination of an optical variable image device by image processing of an image that is optically read from the optical variable image device.

BRIEF DESCRIPTION OF THE DRAWINGS

FIG. 5 shows an example of geometric difference information that the inspection apparatus according to the first embodiment stores in order to perform authenticity determination of the optical variable image device shown in FIGS. 2A to 2C;

FIG. 9 shows an example of geometric difference information that the inspection apparatus according to the first embodiment stores in order to perform authenticity determination of the optical variable image device shown in FIGS. 7A to 7C;

FIG. 14 shows an example of geometric difference information that is stored by the inspection apparatus according to the second embodiment;

FIG. 15 illustrates an example of a processing procedure that is executed by the inspection apparatus according to the second embodiment;

DETAILED DESCRIPTION

According to one embodiment, there is provided an inspection apparatus including: an optical system portion on which a plurality of reflected light rays corresponding to a plurality of observation directions with respect to an optical variable image device are incident and which images the plurality of reflected light rays incident thereon; an imaging portion that images the plurality of reflected light rays imaged by the optical system portion and thereby generates reflected light images corresponding the plurality of respective observation directions; an object relation determination portion that determines whether or not there is a predetermined geometric difference between objects that are contained in reflected light images imaged by the imaging portion and corresponding to different observation directions; and an authenticity determination portion that determines authenticity of the optical variable image device based on a result of the determination by the object relation determination portion.

Referring to the accompanying drawings, the following is an explanation of an inspection apparatus according to several embodiments.

First Embodiment

Figure 1A:
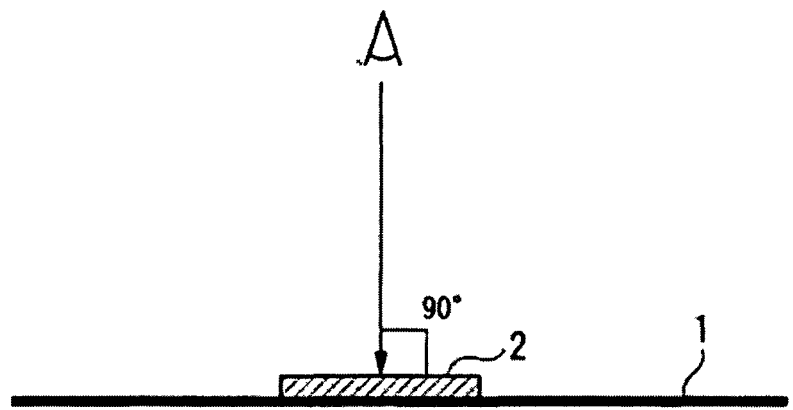
FIGS. 1A to 1C show examples of observation directions with respect to an optical variable image device to be inspected by an inspection apparatus according to a first embodiment.
Figure 1B:
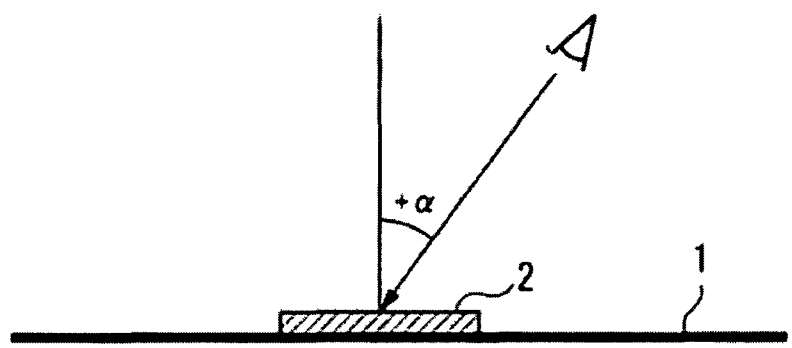
Figure 1C:
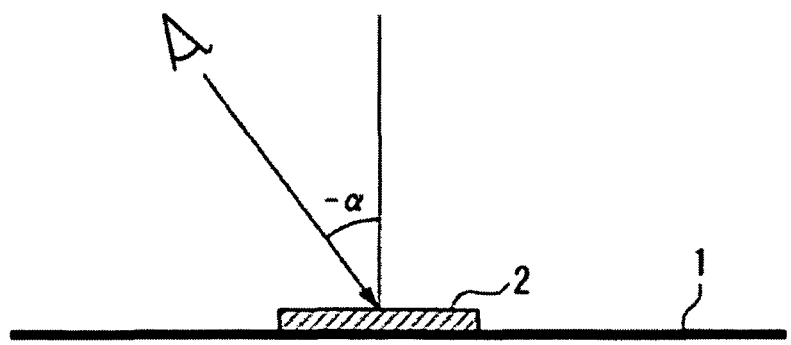

At the start of description of the present embodiment, an example of an optical variable image device (OVID) to be inspected by an inspection apparatus according to the present embodiment will be described with reference to FIGS. 1A to 2C. FIGS. 1A to 1C show a side face of an optical variable image device 2 that is provided on a medium 1. The optical variable image device 2 is provided on the medium 1 by, for example, being stuck thereto. The medium 1 may be, for example, a security or the like.

Figure 2A:
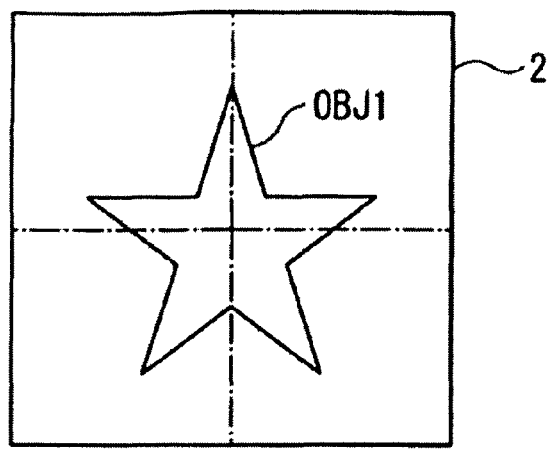
FIGS. 2A to 2C show examples of objects that are observable from different observation directions with respect to the optical variable image device to be inspected by the inspection apparatus according to the first embodiment.
Figure 2B:
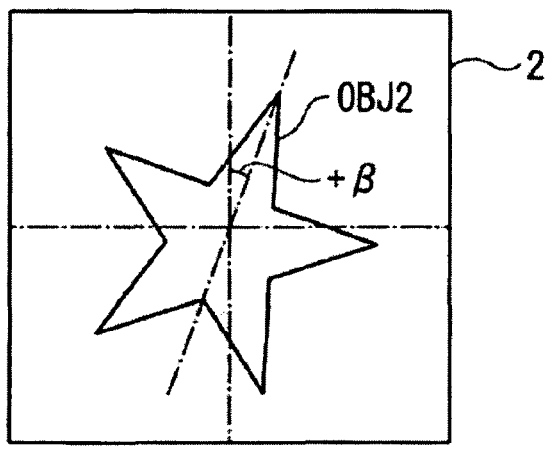
Figure 2C:
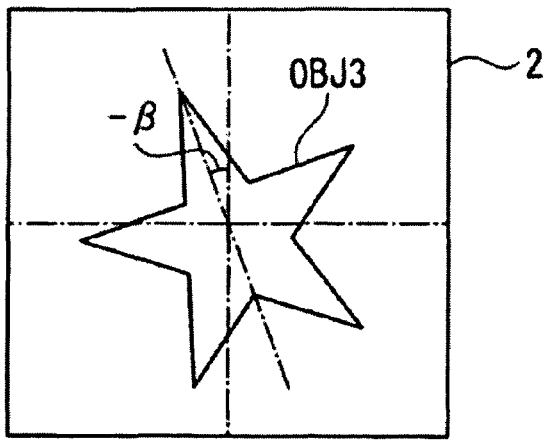

With regard to the optical variable image device 2 of the present embodiment, first, when the optical variable image device 2 is observed from an observation direction that is perpendicular to the surface thereof as shown in FIG. 1A, a first object OBJ1 shown in FIG. 2A is observed. Moreover, with regard to the optical variable image device 2, when the optical variable image device 2 is observed from an observation direction that is at an angle $+\alpha$ to the vertical as shown in FIG. 1B, a second object OBJ2 shown in FIG. 2B is observed. Furthermore, with regard to the optical variable image device 2, when the optical variable image device 2 is observed from an observation direction that is at an angle $-\alpha$ to the vertical as shown in FIG. 1C, a third object OBJ3 shown in FIG. 2C is observed.

Here, if the first object OBJ1 in FIG. 2A is used as a reference, the second object OBJ2 in FIG. 2B corresponds to the first object OBJ1 after being rotated by a rotation angle $+\beta$. Also, the third object OBJ3 in FIG. 2C corresponds to the first object OBJ1 after being rotated by a rotation angle $-\beta$. It should be noted that in the following description, the first object OBJ1, the second object OBJ2, and the third object OBJ3 may be described as the "objects OBJ" if there is no need to make a particular distinction.

As described above, the optical variable image device 2 of the present embodiment is configured such that when this device is observed from the observation directions corresponding to the vertical, the angle $+\alpha$ to the vertical, and the angle $-\alpha$ to the vertical, respectively, the objects having the same shape and size but different rotation angles are viewed.

For example, the inspector visually checks the three objects OBJ that are observed by observing the optical variable image device 2 from the three observation directions corresponding to the vertical, the angle $+\alpha$ to the vertical, and the angle $-\alpha$ to the vertical, respectively, as shown in FIGS. 1A to 1C. Then, as a result of the visual check, if the three objects OBJ are viewed as having the respective shapes, sizes, and rotation angles shown in FIGS. 2A to 2C, the inspector determines that the optical variable image device 2 is genuine.

On the other hand, if at least one of the three observed objects OBJ is viewed as having a different shape or size, the inspector determines that the optical variable image device 2 is a counterfeit. Alternatively, even when the shape and the size are the same, if at least one of the three observed objects OBJ is not viewed with the rotation angle shown in FIG. 2A, 2B, or 2C, the inspector determines that the optical variable image device 2 is a counterfeit.

The inspection apparatus of the present embodiment is configured so as to be capable of performing authenticity determination of the optical variable image device 2 as described above by image processing of an image that is obtained by imaging the optical variable image device 2, without depending on the sense of sight of a person such as the inspector.

Figure 3:
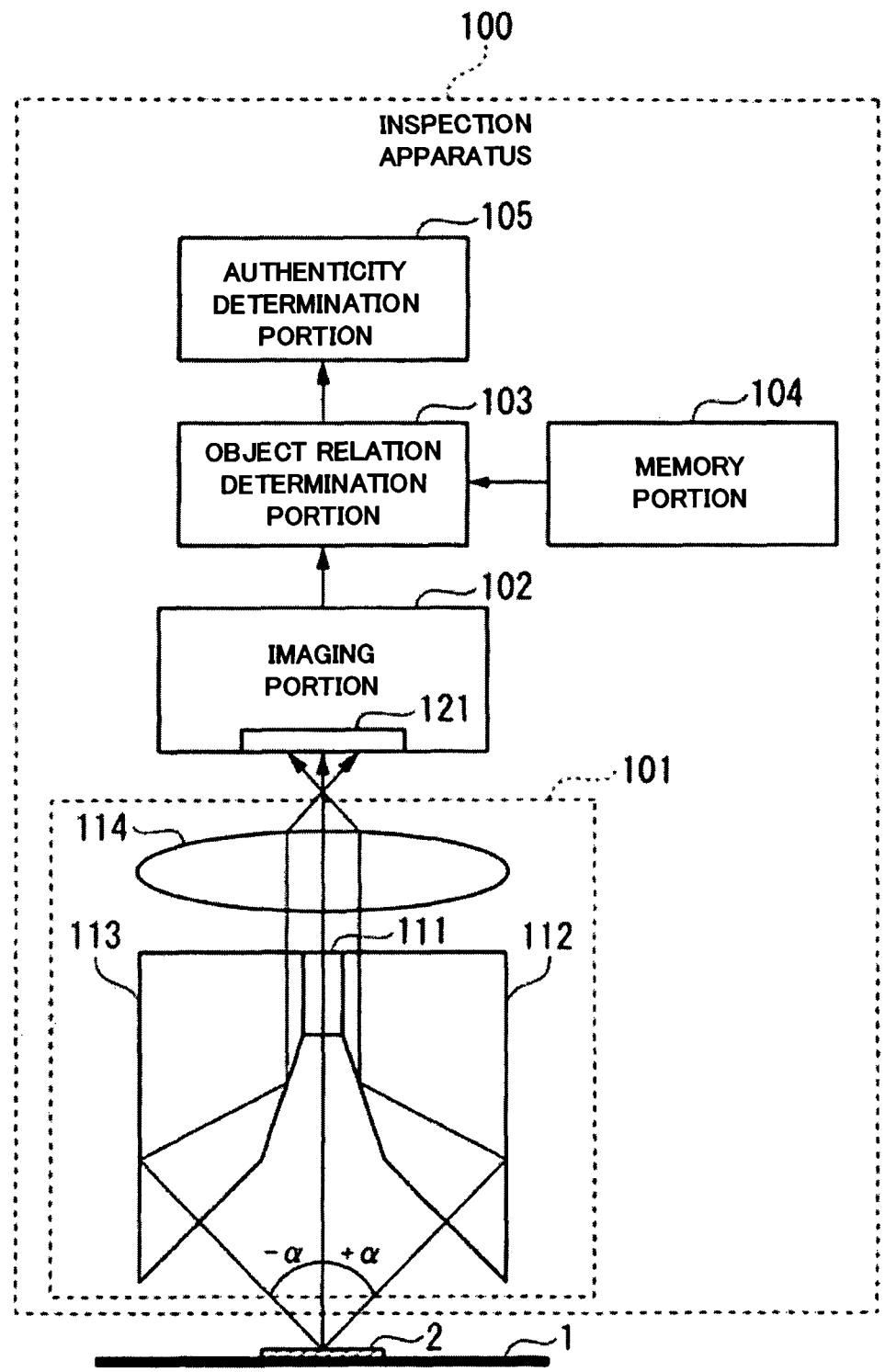
FIG. 3 is a diagram showing an example of the configuration of the inspection apparatus according to the first embodiment.

FIG. 3 shows an example of the configuration of an inspection apparatus 100 according to the present embodiment. The inspection apparatus 100 shown in FIG. 3 includes an optical system portion 101, an imaging portion 102, an object relation determination portion 103, a memory portion 104, and an authenticity determination portion 105.

In FIG. 3, the optical variable image device 2 provided on the medium 1 is irradiated with diffuse light from an illumination device, which is not shown. The irradiated diffuse light is reflected by the optical variable image device 2.

A plurality of reflected light rays corresponding to a plurality of observation directions with respect to the optical variable image device 2 are incident on the optical system portion 101, and the optical system portion 101 images the plurality of reflected light rays incident thereon. The optical system portion 101 shown in FIG. 3 includes a prism 111, a prism 112, a prism 113, and an imaging lens 114.

A reflected light ray (hereinafter also referred to as "first reflected light ray") from the optical variable image device 2 that corresponds to the observation direction that is perpendicular to the surface of the optical variable image device 2 is incident on the prism 111. The prism 111 allows the incident first reflected light ray to exit to a position at which the first reflected light ray coincides with the optical axis of the imaging lens 114.

A reflected light ray (hereinafter also referred to as "second reflected light ray") from the optical variable image device 2 that corresponds to the observation direction indicated by the angle $+\alpha$ is incident on the prism 112. The prism 112 reflects the incident second reflected light ray inside along a path shown in the diagram and then directs the second reflected light ray to the imaging lens 114. Here, a configuration is adopted in which the position of incidence of the second reflected light ray on the imaging lens 114 is different from the position of incidence of the first reflected light ray.

A reflected light ray (hereinafter also referred to as "third reflected light ray") from the optical variable image device 2 that corresponds to the observation direction indicated by the angle $-\alpha$ is incident on the prism 113. The prism 113 reflects the incident third reflected light ray inside along a path shown in the diagram and then directs the light ray to the imaging lens 114. Here, a configuration is adopted in which the position of incidence of the third reflected light ray on the imaging lens 114 is different from both of the positions of incidence of the first reflected light ray and the second reflected light ray.

The first reflected light ray exiting the prism 111, the second reflected light ray exiting the prism 112, and the third reflected light ray exiting the prism 113 are individually incident on the imaging lens 114 from different positions. The imaging lens 114 of the present embodiment may be, for example, a telecentric lens, which is configured such that principal rays pass through the focal point. Moreover, the reflected light rays exiting the prism 111, the prism 112, and the prism 113, respectively, are adjusted so as to have the same focal length by setting the path lengths and the like of light through the prism 111, the prism 112, and the prism 113. Thus, the imaging lens 114 can image each of the first reflected light ray, the second reflected light ray, and the third reflected light ray that are individually reflected by the optical variable image device 2, corresponding to the different observation directions, onto an area sensor 121 of the imaging portion 102. It should be noted that among the first reflected light ray, the second reflected light ray, and the third reflected light ray that are incident on the imaging lens 114, which is a telecentric lens, the optical path of the first reflected light ray, which is incident on the position that coincides with the optical axis of the lens, passes in a straight line as it is and reaches the area sensor 121. On the other hand, the second reflected light ray and the third reflected light ray, which are incident on positions deviated from the optical axis of the imaging lens 114, are each refracted when exiting the imaging lens 114, so that their optical paths cross each other before reaching the area sensor 121, as shown in the diagram.

The imaging portion 102 images the plurality of reflected light rays (first reflected light ray, second reflected light ray, and third reflected light ray) that are imaged by the optical system portion 101, and thereby generates images (reflected light images) corresponding to the plurality of respective observation directions. The imaging portion 102 according to the present embodiment includes the area sensor 121. The first reflected light ray, the second reflected light ray, and the third reflected light ray are incident on a light-receiving surface constituting the area sensor 121 in a state in which the reflected light rays are individually imaged. That is to say, the area sensor 121 is provided such that the reflected light rays corresponding to the respective observation directions that are imaged by the optical system portion 101 are received by one light-receiving surface. The area sensor 121 converts light that is received by the light-receiving surface into signals (light-receiving signals). It should be noted that the imaging portion 102 may also be configured such that a separate area sensor 121 is provided for each observation direction, and each of the area sensors 121 receives a reflected light ray from the corresponding observation direction. The imaging portion 102 generates images of the first reflected light ray, the second reflected light ray, and the third reflected light ray, respectively, from the light-receiving signals obtained by the area sensor 121.

Figure 4:
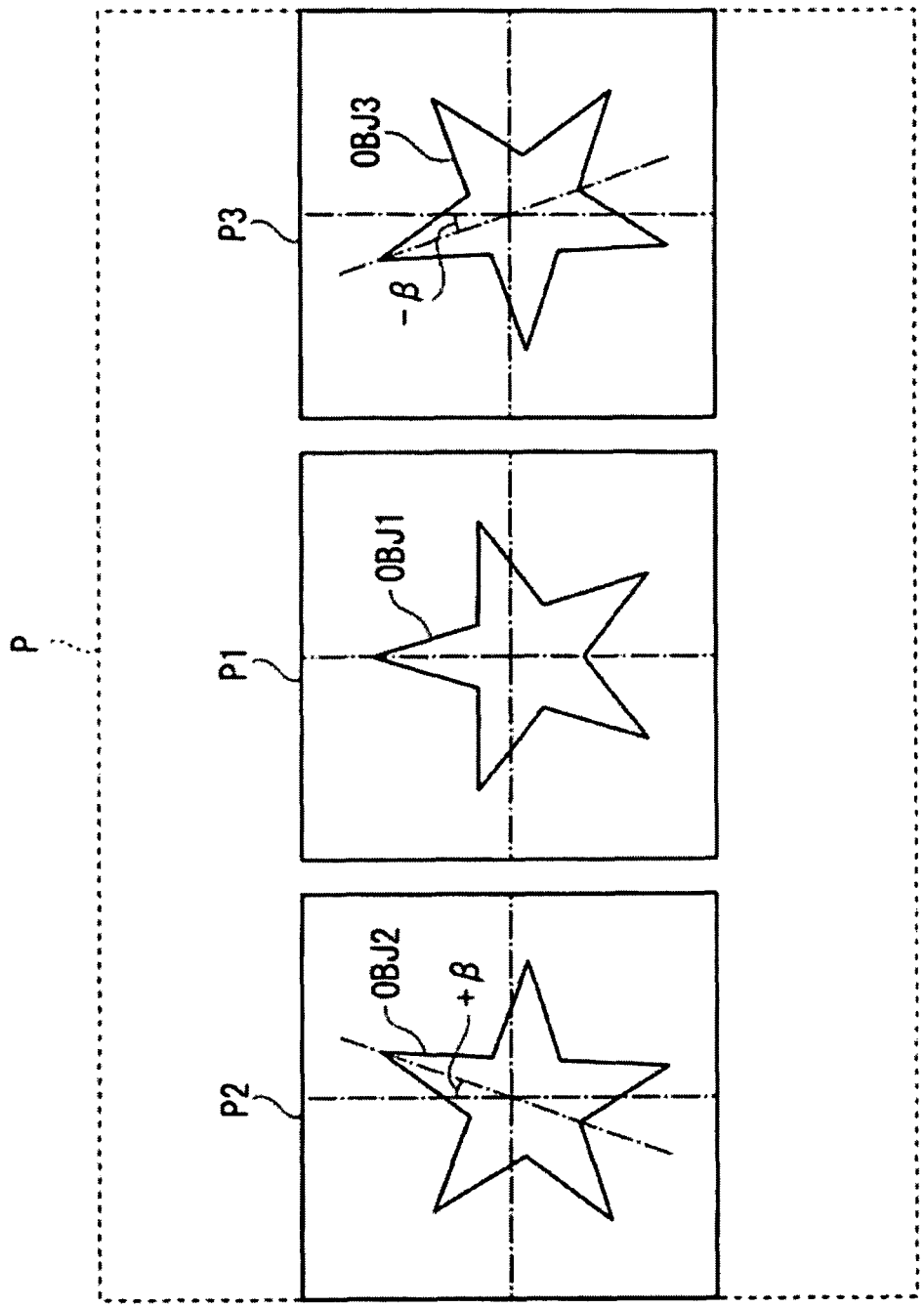
FIG. 4 shows an example of a reflected light image that is obtained by the inspection apparatus according to the first embodiment imaging reflected light rays from the optical variable image device shown in FIGS. 2A to 2C.

FIG. 4 shows the images of the first reflected light ray, the second reflected light ray, and the third reflected light ray, respectively, that are generated by the imaging portion 102 of the present embodiment. An image P in FIG. 4 is generated based on the light-receiving signals that are obtained by the entire area sensor 121 receiving light. For example, if the positional relationship between the optical variable image device 2 and the imaging portion 102 when imaging is performed by the imaging portion 102 is defined beforehand, regions of the image P that correspond to the first reflected light ray, the second reflected light ray, and the third reflected light ray, respectively, are known. Thus, the imaging portion 102 cuts the regions corresponding to the first reflected light ray, the second reflected light ray, and the third reflected light ray, respectively, out of the image P. By cutting the regions out of the image P in this manner, the imaging portion 102 generates a first reflected light image P1 that is the image of the first reflected light ray, a second reflected light image P2 that is the image of the second reflected light ray, and a third reflected light image P3 that is the image of the third reflected light ray. Thus, according to the present embodiment, images of reflected light rays from the optical variable image device 2 that correspond to the respective observation directions shown in FIGS. 1A to 1C are converted into data.

Now, the description refers again to FIG. 3. The object relation determination portion 103 determines whether or not there is a predetermined geometric difference between objects that are contained in reflected light images imaged by the imaging portion 102 and corresponding to different observation directions. That is to say, the object relation determination portion 103 applies a predetermined geometric transformation to at least one of an object that is contained in a reflected light image generated by imaging a reflected light ray corresponding to one observation direction and another object that is contained in a reflected light image corresponding to another observation direction that is different from the aforementioned observation direction. Then, the object relation determination portion 103, after performing geometric transformation processing, determines whether or not the two objects coincide with each other.

The object relation determination portion 103 of the present embodiment applies a geometric transformation so that the first object OBJ1 and the second object OBJ2 in the second reflected light image P2 coincide with each other. In the example shown in FIG. 4, if the first object OBJ1 is used as a reference, the second object OBJ2 is regarded to be the first object OBJ1 after being rotated by the rotation angle +β. That is to say, the second object OBJ2 has a geometric difference from the first object OBJ1 in that the second object OBJ2 is rotated by the rotation angle +β relative to the first object OBJ1.

Thus, the object relation determination portion 103 applies a geometric transformation so as to, for example, rotate the first object OBJ1 by the rotation angle +β. Then, the object relation determination portion 103 compares the first object OBJ1 after the geometric transformation with the second object OBJ2. It should be noted that, conversely, a configuration may also be adopted in which the object relation determination portion 103 applies a geometric transformation so as to rotate the second object OBJ2 by the rotation angle −β and compares the second object OBJ2 after the geometric transformation with the first object OBJ1.

The object relation determination portion 103 determines, as a result of the comparison, whether or not the two objects coincide with each other in an exactly superposed manner. If the two objects coincide with each other, it can be said that the first object OBJ1 and the second object OBJ2 have the same relationship regarding the geometric difference as those of the genuine optical variable image device 2.

Moreover, the object relation determination portion 103, using, similarly to the foregoing description, the first object OBJ1 in the first reflected light image P1 as a reference, sets the third object OBJ3 in the third reflected light image P3 as a comparison target. Then, the object relation determination portion 103 applies a geometric transformation so that the first object OBJ1 and the third object OBJ3 coincide with each other.

That is to say, in the example shown in FIG. 4, the third object OBJ3 is regarded to be the first object OBJ1, which serves as the reference, after being rotated by the rotation angle −β. That is to say, the third object OBJ3 has a geometric difference from the first object OBJ1 in that the third object OBJ3 is rotated by the rotation angle −β relative to the first object OBJ1. Thus, the object relation determination portion 103 applies a geometric transformation so as to, for example, rotate the first object OBJ1 by the rotation angle −β. Then, the object relation determination portion 103 compares the first object OBJ1 after the geometric transformation with the third object OBJ3. It should be noted that, conversely, a configuration may also be adopted in which the object relation determination portion 103 applies a geometric transformation so as to rotate the third object OBJ3 by the rotation angle +β and then makes a comparison with the first object OBJ1.

The object relation determination portion 103 determines, as a result of the comparison, whether or not the two objects coincide with each other in an exactly superposed manner. If the two objects coincide with each other, it can be said that the first object OBJ1 and the third object OBJ3 have the same relationship regarding the geometric difference as those of the genuine optical variable image device 2.

When applying a geometric transformation as described above, the object relation determination portion 103 uses geometric difference information that is stored in the memory portion 104. FIG. 5 shows an example of the geometric difference information that is stored in the memory portion 104 for the optical variable image device 2 exemplified in FIGS. 2A to 2C. The geometric difference information shown in FIG. 5 has a structure in which a geometric difference is associated with each object correspondence relationship. In the geometric difference information on the first row in FIG. 5, "#1:#2" that is shown as an object correspondence relationship indicates that the second object OBJ2 is brought into correspondence with the first object OBJ1 serving as the reference. It is shown that the geometric difference associated with the object correspondence relationship "#1:#2" is "rotation angle:+β". That is to say, the first row of the geometric difference information indicates that the geometric difference of the second object OBJ2 from the first object OBJ1 is a rotation by the rotation angle +β.

Also, in the geometric difference information on the second row, "#1:#3" that is shown as an object correspondence relationship indicates that the third object OBJ3 is brought into correspondence with the first object OBJ1 serving as the reference. It is shown that the geometric difference associated with the object correspondence relationship "#1:#3" is "rotation angle:−β". That is to say, the second row of the geometric difference information indicates that the geometric difference of the third object OBJ3 from the first object OBJ1 is a rotation by the rotation angle −β.

Then, the authenticity determination portion 105 in FIG. 3 determines the authenticity of the optical variable image device 2 based on the result of determination of the object relation determination portion 103.

If the object relation determination portion 103 determines that the first object OBJ1 after the geometric transformation coincides with the second object OBJ2 and the first object OBJ1 after the geometric transformation coincides with the third object OBJ3, the following applies. That is to say, in this case, the relationships between the first object OBJ1, the second object OBJ2, and the third object OBJ3 regarding the geometric difference are the same as those of objects that are observable from the respective observation directions with respect to the genuine optical variable image device 2. Thus, in this case, the authenticity determination portion 105 determines that the optical variable image device 2 is genuine. It should be noted that in accordance with the determination that the optical variable image device 2 is genuine, the authenticity determination portion 105 may determine that the medium 1 provided with the optical variable image device 2 is also genuine.

On the other hand, if the object relation determination portion 103 determines that the first object OBJ1 after the geometric transformation and the second object OBJ2 do not coincide with each other, the following applies. That is to say, in this case, at least one of the first object OBJ1 and the second object OBJ2 is different from the object that is observable with respect to the genuine optical variable image device 2. Also, if it is determined that the first object OBJ1 after the geometric transformation and the third object OBJ3 do not coincide with each other, the following applies. That is to say, in this case, at least one of the first object OBJ1 and the third object OBJ3 is different from the object that is observable with respect to the genuine optical variable image device 2. Thus, if at least one of the second object OBJ2 and the third object OBJ3 does not coincide with the first object OBJ1 after the geometric transformation, the authenticity determination portion 105 determines that the optical variable image device 2 is a counterfeit. It should be noted that in accordance with the determination that the optical variable image device 2 is a counterfeit, the authenticity determination portion 105 may determine that the medium 1 provided with the optical variable image device 2 is also a counterfeit.

In this manner, the inspection apparatus 100 according to the present embodiment can optically capture each of images that are observed from the optical variable image device 2 corresponding to different observation directions and perform authenticity determination of the optical variable image device 2 based on the captured images.

Next, an example of a processing procedure that is executed by the inspection apparatus 100 will be described with reference to the flowchart in FIG. 6. In the inspection apparatus 100, the first reflected light image P1 among the first reflected light image P1, the second reflected light image P2, and the third reflected light image P3 that are generated by the imaging portion 102 is input to the object relation determination portion 103 (step S101).

Next, the object relation determination portion 103 recognizes the first object OBJ1 on the first reflected light image P1 that is input in step S101 (step S102). For recognition of the first object OBJ1, for example, object data indicating an object that is congruent with the first object OBJ1 is stored in the memory portion 104 beforehand, and the object relation determination portion 103 can recognize a pattern that is congruent with the object indicated by the object data stored in the memory portion 104 from the first reflected light image P1. Alternatively, the object relation determination portion 103 can recognize the first object OBJ1 by recognizing a characteristic drawing pattern from the first reflected light image P1 using a method such as edge detection. In this case, it is not necessary to store the object data in the memory portion 104.

Also, the second reflected light image P2 that is generated by the imaging portion 102 is input to the object relation determination portion 103 (step S103). The object relation determination portion 103 recognizes the second object OBJ2 from the second reflected light image P2 that is input in step S103 by performing the same processing as that in step S102 (step S104).

Also, the third reflected light image P3 that is generated by the imaging portion 102 is input to the object relation determination portion 103 (step S105). The object relation determination portion 103 recognizes the third object OBJ3 from the third reflected light image P3 that is input in step S105 by performing the same processing as that in step S102 (step S106).

It should be noted that the order in which the processing in steps S101 and S102, the processing in steps S103 and S104, and the processing in steps S105 and S106 are executed may be changed as appropriate.

Next, the object relation determination portion 103 applies a geometric transformation to the first object OBJ1 in accordance with the geometric difference between the first object OBJ1 and the second object OBJ2 (step S107). Specifically, the object relation determination portion 103 applies a geometric transformation to the first object OBJ1 in accordance with the geometric difference that is associated with the object correspondence relationship "#1:#2" in the geometric difference information (FIG. 4) stored in the memory portion 104. That is to say, in the example shown in FIG. 4, the geometric difference associated with the object correspondence relationship "#1:#2" is a rotation by the rotation angle +β. Thus, in step S107, the object relation determination portion 103 applies a geometric transformation that rotates the first object OBJ1 by the rotation angle +β on the first reflected light image P1.

Next, the object relation determination portion 103 compares the first object OBJ1 after the geometric transformation in step S107 with the second object OBJ2 that is recognized in step S104 (step S108). For this purpose, the object relation determination portion 103, for example, superimposes the first reflected light image P1 containing the first object OBJ1 after the geometric transformation in step S107 and the second reflected light image P2 containing the second object OBJ2 one on top of the other. The comparison between the first object OBJ1 and the second object OBJ2 is made by superimposing the first reflected light image P1 and the second reflected light image P2 in this manner.

The object relation determination portion 103 determines, as a result of the comparison in step S108, whether or not the first object OBJ1 after the geometric transformation coincides with the second object OBJ2 in an exactly superposed state (step S109). If the first object OBJ1 after the geometric transformation does not coincide with the second object OBJ2 (step S109-NO), the authenticity determination portion 105 determines that the optical variable image device 2 is a counterfeit (step S114). As described above, if it is determined that the optical variable image device 2 is a counterfeit, the authenticity determination portion 105 may determine that the medium 1 provided with the optical variable image device 2 is also a counterfeit.

On the other hand, if the first object OBJ1 after the geometric transformation coincides with the second object OBJ2 (step S109-YES), the object relation determination portion 103 further executes the following processing. That is to say, the object relation determination portion 103 applies a geometric transformation to the first object OBJ1 in accordance with the geometric difference between the first object OBJ1 and the third object OBJ3 (step S110). Specifically, the object relation determination portion 103 applies a geometric transformation to the first object OBJ1 in accordance with the geometric difference that is associated with the object correspondence relationship "#1:#3" in the geometric difference information (FIG. 4) stored in the memory portion 104. In the example shown in FIG. 4, the geometric difference associated with the object correspondence relationship "#1:#3" is a rotation by the rotation angle −β. Thus, in step S110, the object relation determination portion 103 applies a geometric transformation that rotates the first object OBJ1 by the rotation angle −β on the first reflected light image P1.

Next, the object relation determination portion 103 compares the first object OBJ1 after the geometric transformation in step S110 with the third object OBJ3 that is recognized in step S106 (step S111).

The object relation determination portion 103 determines, as a result of the comparison in step S111, whether or not the first object OBJ1 after the geometric transformation coincides with the third object OBJ3 (step S112).

If the first object OBJ1 after the geometric transformation does not coincide with the third object OBJ3 (step S112-NO), the authenticity determination portion 105 determines that the optical variable image device 2 is a counterfeit (step S114).

On the other hand, if the first object OBJ1 after the geometric transformation coincides with the third object OBJ3 (step S112-YES), the authenticity determination portion 105 determines that the optical variable image device 2 is genuine (step S113). Then, if the determination result that the optical variable image device 2 is genuine is obtained, the authenticity determination portion 105 may determine that the medium 1 provided with the optical variable image device 2 is also genuine.

Figure 6:
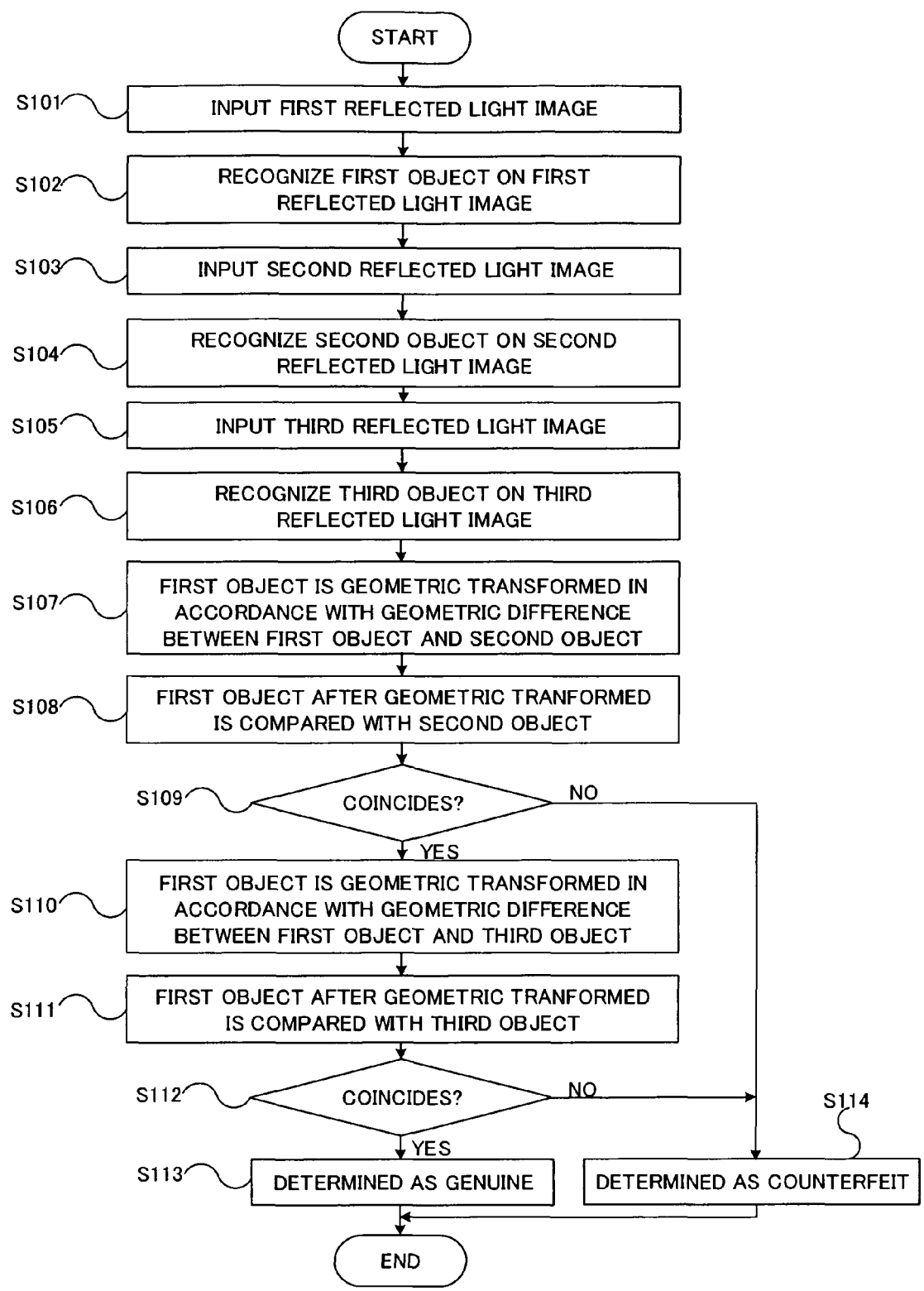
FIG. 6 is a flowchart illustrating an example of a processing procedure that is executed by the inspection apparatus according to the first embodiment.

It should be noted that in FIG. 6, the processing order may be changed so that steps S107 to S109 are executed after steps S110 to S112.

The processing illustrated in FIG. 6 makes it possible for the inspection apparatus 100 to appropriately perform authenticity determination of the optical variable image device 2 based on images that are observed from respective observation directions with respect to the optical variable image device 2.

The inspection apparatus 100 of the present embodiment can also perform authenticity determination of the optical variable image device 2 with which the state of objects observable from respective observation directions changes in accordance with a geometric difference other than the rotation angles, which are exemplified in FIGS. 2A to 2C. Thus, hereinafter, the optical variable image device 2 with which objects having a geometric difference that can be dealt with by the inspection apparatus 100 are observed will be described using two examples (first example and second example) in which the geometric difference is not a rotation angle.

Figure 7A:
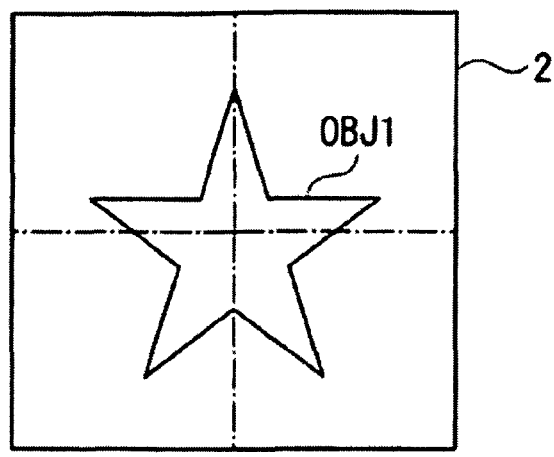
FIGS. 7A to 7C show an example in which a geometric difference between objects that are observable from an optical variable image device when observed from different observation directions is due to movement.
Figure 7B:
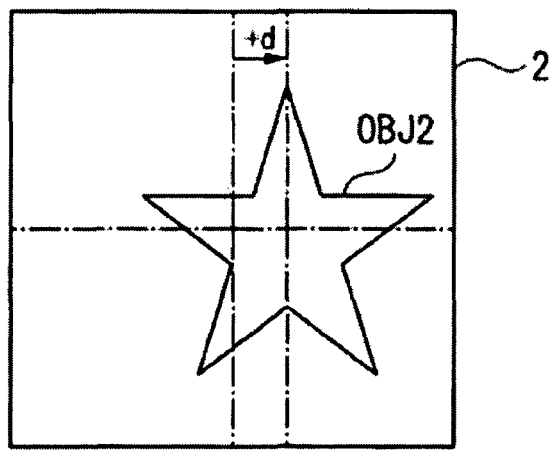
Figure 7C:
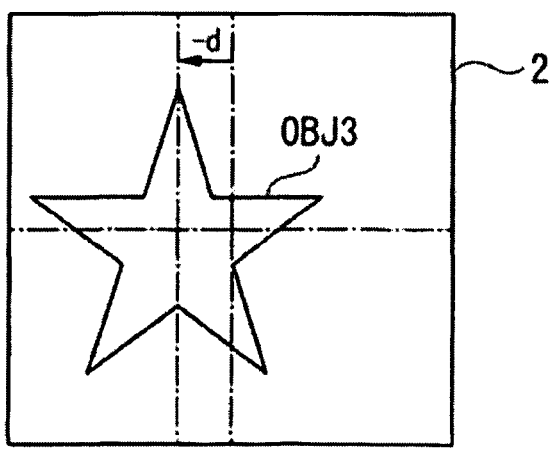

First, as the first example, the optical variable image device 2 with which objects that have the same size and shape (i.e., that are congruent) are observed at different positions depending on observation directions will be described with reference to FIGS. 7A to 7C. FIGS. 7A, 7B, and 7C show the states of the objects that are visually recognized by observing the optical variable image device 2 from the observation directions in FIGS. 1A, 1B, and 1C, respectively.

That is to say, when the optical variable image device 2 is observed from the vertical observation direction (FIG. 1A), as shown in FIG. 7A, the first object OBJ1 is visually recognized in a state in which this object is located in the center with respect to a left-right direction. On the other hand, when the optical variable image device 2 is observed from the observation direction that is at the angle +α (FIG. 1B), as shown in FIG. 7B, the second object OBJ2 corresponding to the first object OBJ1 that is moved to the right from the state shown in FIG. 7A is visually recognized. In FIG. 7B, the distance for which the second object OBJ2 is moved rightward relative to the first object OBJ1 is indicated by +d. Also, when the optical variable image device 2 is observed from the observation direction that is at the angle −α (FIG. 1C), as shown in FIG. 7C, the third object OBJ3 corresponding to the first object OBJ1 that is moved to the left from the state shown in FIG. 7A is visually recognized. In FIG. 7C, the distance for which the third object OBJ3 is moved leftward relative to the first object OBJ1 is indicated by −d.

Figure 8:
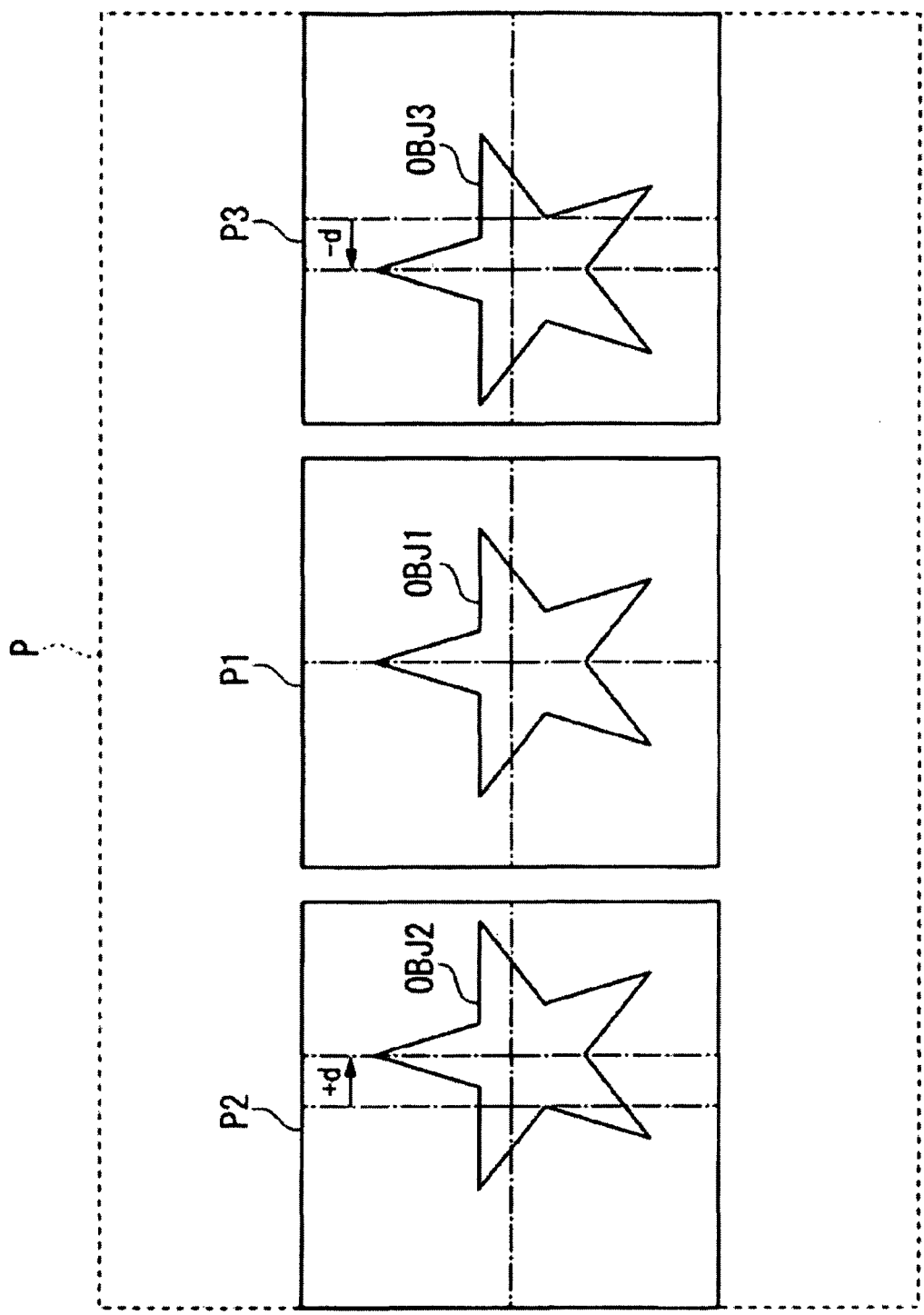
FIG. 8 shows an example of a reflected light image that is obtained by the inspection apparatus according to the first embodiment imaging reflected light rays from the optical variable image device shown in FIGS. 7A to 7C.

FIG. 8 shows images (first reflected light image P1, second reflected light image P2, and third reflected light image P3) that are obtained by the imaging portion 102 imaging the reflected light rays from the optical variable image device 2 shown in FIGS. 7A to 7C, the reflected light rays corresponding to the respective observation directions. As shown in FIG. 8, the first object OBJ1 that is located in the center is contained in the range of the region of the first reflected light image P1. Also, the second object OBJ2 that is moved for the distance +d in the left-right direction is contained in the range of the region of the second reflected light image P2. Also, the third object OBJ3 that is moved for the distance −d in the left-right direction is contained in the range of the region of the third reflected light image P3.

In order for the inspection apparatus 100 of the present embodiment to perform authenticity determination of the optical variable image device 2 in FIGS. 7A to 7C, the memory portion 104 stores geometric difference information having the contents corresponding to the optical variable image device 2 in FIGS. 7A to 7C.

FIG. 9 shows an example of the geometric difference information corresponding to the optical variable image device 2 in FIGS. 7A to 7C. The geometric difference information on the first row in FIG. 9 indicates that the geometric difference of the second object OBJ2 from the first object OBJ1 is due to movement, and the amount of that movement is represented by (x=+d, y=0). Also, the geometric difference information on the second row in FIG. 9 indicates that the geometric difference of the third object OBJ3 from the first object OBJ1 is due to movement, and the amount of that movement is represented by (x=−d, y=0).

According to the example shown in FIG. 9, a movement of an object is represented by a combination of a movement amount component in an x-axis direction and a movement amount component in a y-axis direction. This representation of an object's movement using the combination of movement amount components in the x-axis direction and the y-axis direction makes it possible to deal with even a movement of the object in a vertical direction and in a diagonal direction without limitation to a movement of the object in the left-right direction as shown in FIGS. 7A to 7C.

To perform processing of authenticity determination of the optical variable image device 2 in FIGS. 7A to 7C, the object relation determination portion 103 of the inspection apparatus 100 executes the following processing in step S107 of FIG. 6. That is to say, the object relation determination portion 103 executes geometric transformation processing that moves the first object OBJ1, within the first reflected light image P1, by the amount of movement (x=+d) in the x-axis direction and the amount of movement (y=0) in the y-axis direction, which are indicated by the geometric difference information on the first row in FIG. 9.

In step S108, the object relation determination portion 103 compares the first object OBJ1 after the movement with the second object OBJ2 that is recognized in step S104. Then, in step S109, the object relation determination portion 103 determines, from the result of the comparison in step S108, whether or not the first object OBJ1 after the movement coincides with the second object OBJ2.

Also, in step S110, the object relation determination portion 103 executes geometric transformation processing that moves the first object OBJ1 by the amount of movement (x=−d) in the x-axis direction and the amount of movement (y=0) in the y-axis direction, which are indicated by the geometric difference information on the second row in FIG. 9. In step S111, the object relation determination portion 103 compares the first object OBJ1 after the movement with the third object OBJ3 that is recognized in step S106. Then, in step S112, the object relation determination portion 103 determines, from the result of the comparison in step S111, whether or not the first object OBJ1 after the movement coincides with the second object OBJ2.

Then, if the determination result that the two objects do not coincide with each other is obtained in either step S109 or S112, the authenticity determination portion 105 determines that the optical variable image device 2 is a counterfeit. On the other hand, if the determination result that the two objects coincide with each other is obtained in step S112, the authenticity determination portion 105 determines that the optical variable image device 2 is genuine.

Figure 10A:
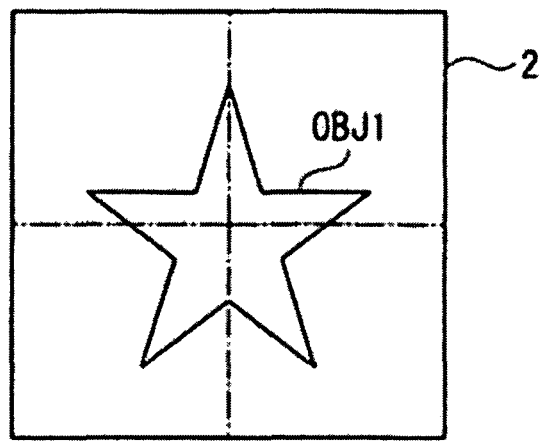
FIGS. 10A to 10C show an example in which a geometric difference between objects that are observable from an optical variable image device when observed from different observation directions is due to enlargement or reduction.
Figure 10B:
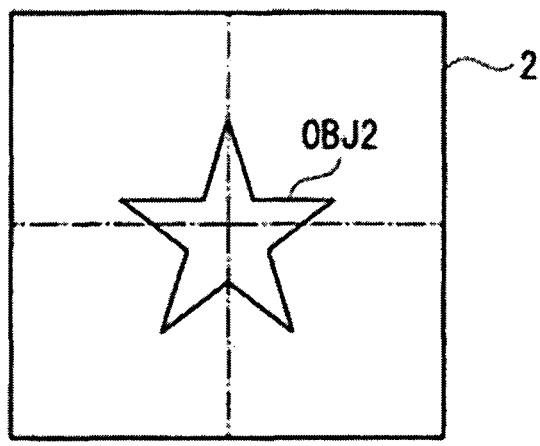
Figure 10C:
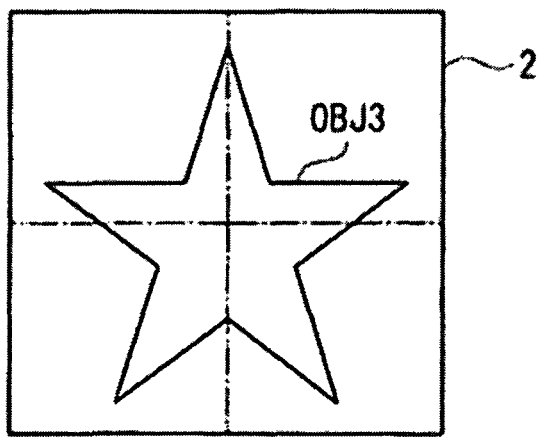

Next, as the second example, the optical variable image device 2 with which objects having similar shapes are observed in different sizes depending on observation directions will be described with reference to FIGS. 10A to 10C. FIGS. 10A, 10B, and 10C show the states of the objects that can be viewed by observing the optical variable image device 2 from the observation directions shown in FIGS. 1A, 1B, and 1C, respectively.

That is to say, when the optical variable image device 2 is observed from the vertical observation direction (FIG. 1A), as shown in FIG. 10A, the first object OBJ1 that is located in the center with respect to the left-right direction is visually recognized in a predetermined size. On the other hand, when the optical variable image device 2 is observed from the observation direction that is at the angle +α (FIG. 1B), as shown in FIG. 10B, the second object OBJ2 in a size corresponding to the first object OBJ1 that is reduced by a predetermined scaling factor of less than 1 (100%) is visually recognized. Also, when the optical variable image device 2 is observed from the observation direction that is at the angle −α (FIG. 1C), as shown in FIG. 10C, the third object OBJ3 in a size corresponding to the first object OBJ1 that is enlarged by a predetermined scaling factor of more than 1 is visually recognized.

Figure 11:
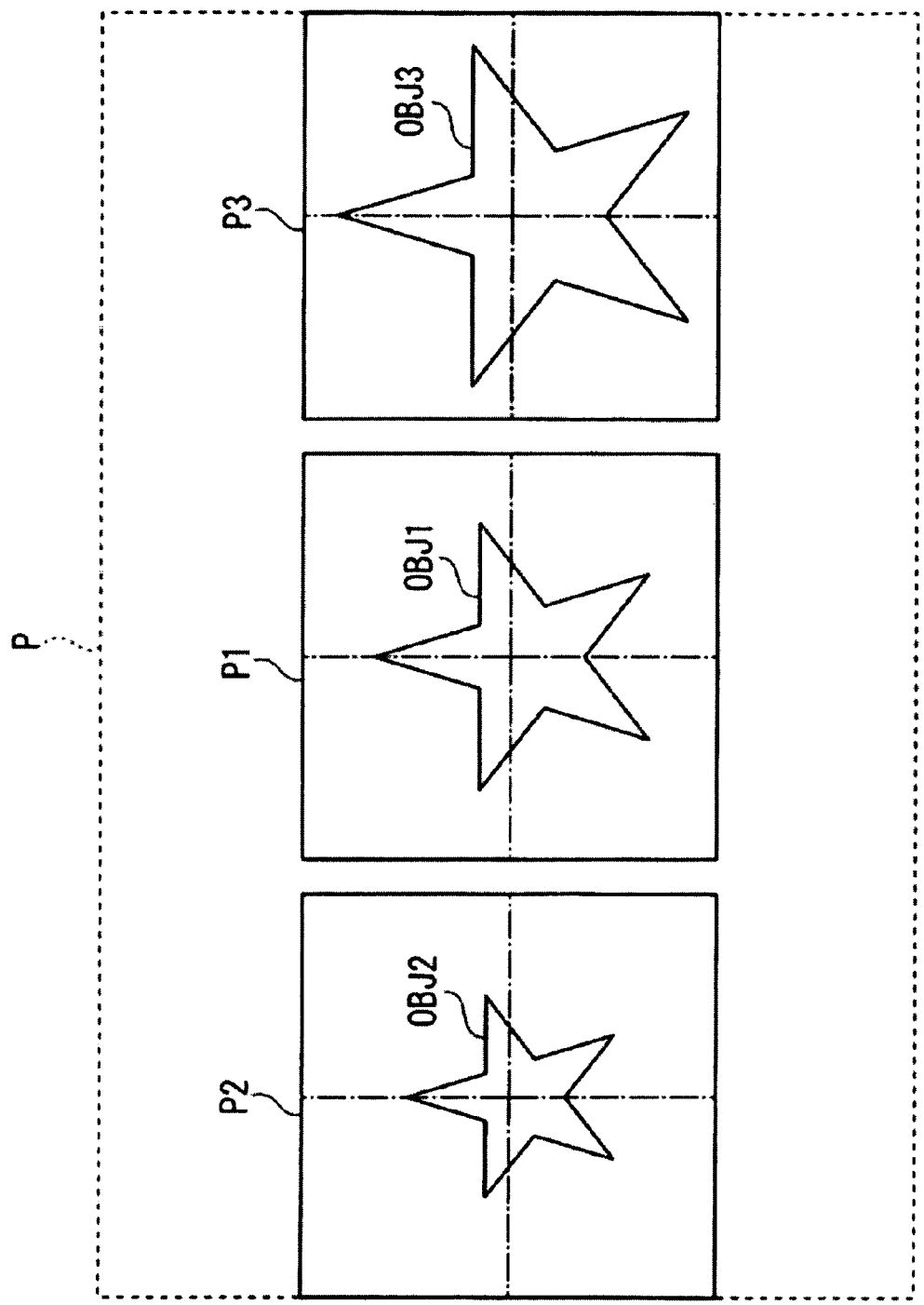
FIG. 11 shows an example of a reflected light image that is obtained by the inspection apparatus according to the first embodiment imaging reflected light rays from the optical variable image device shown in FIGS. 10A to 10C.

FIG. 11 shows images (first reflected light image P1, second reflected light image P2, and third reflected light image P3) that are obtained by imaging the reflected light rays from the optical variable image device 2 shown in FIGS. 10A to 10C, the reflected light rays corresponding to the respective observation directions, using the optical system portion 101 and the imaging portion 102 of the inspection apparatus 100. As shown in FIG. 11, the first object OBJ1 of the predetermined size that is located in the center is contained in the range of the region of the first reflected light image P1. Also, the second object OBJ2 of the size corresponding to the first object OBJ1 that is reduced by the predetermined scaling factor of less than 1 is contained in the range of the region of the second reflected light image P2. Also, the third object OBJ3 of the size corresponding to the first object OBJ1 that is reduced by the predetermined scaling factor of more than 1 is contained in the range of the region of the third reflected light image P3.

In order for the inspection apparatus 100 of the present embodiment to perform authenticity determination of the optical variable image device 2 in FIGS. 10A to 10C, the memory portion 104 stores geometric difference information having the contents corresponding to the optical variable image device 2 in FIGS. 10A to 10C.

Figures 12, 13:
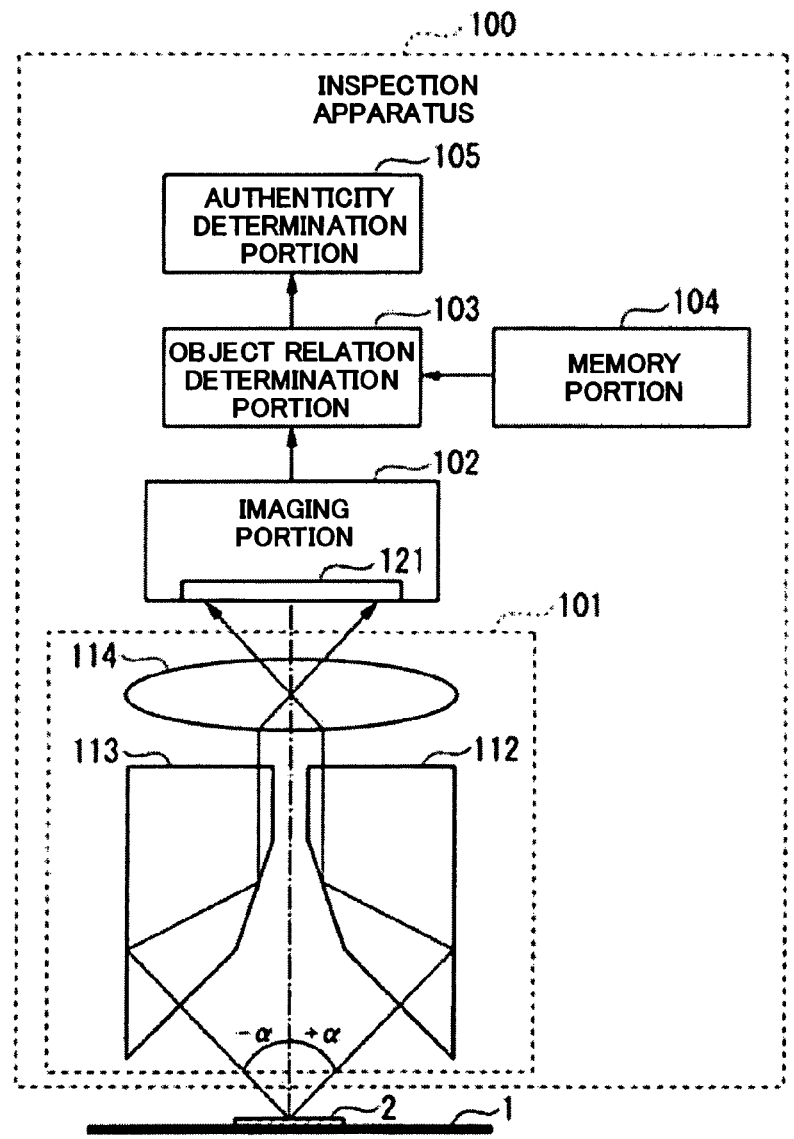
FIG. 12 shows an example of geometric difference information that the inspection apparatus according to the first embodiment stores in order to perform authenticity determination of the optical variable image device shown in FIGS. 10A to 10C.
FIG. 13 is a diagram showing an example of the configuration of an inspection apparatus according to a second embodiment.

FIG. 12 shows an example of the geometric difference information corresponding to the optical variable image device 2 in FIGS. 10A to 10C. The geometric difference information on the first row in FIG. 12 indicates that the geometric difference of the second object OBJ2 from the first object OBJ1 is due to scaling, and the scaling factor relative to the first object OBJ1 is $e_1$. Also, the geometric difference information on the second row in FIG. 12 indicates that the geometric difference of the third object OBJ3 from the first object OBJ1 is due to scaling, and the scaling factor relative to the first object OBJ1 is $e_2$. It should be noted that according to the correspondence to FIGS. 10A to 10C, the scaling factor $e_1$ has a value of less than 1, and the scaling factor $e_2$ has a value of more than 1.

To perform processing of authenticity determination of the optical variable image device 2 in FIGS. 10A to 10C, the object relation determination portion 103 of the inspection apparatus 100, in step S107 of FIG. 6, executes geometric transformation processing that reduces the first object OBJ1 by the scaling factor $e_1$, which is indicated by the geometric difference information on the first row in FIG. 12. In step S108, the object relation determination portion 103 compares the first object OBJ1 after the reduction with the second object OBJ2 that is recognized in step S104. Then, in step S109, the object relation determination portion 103 determines, from the result of the comparison in step S108, whether or not the first object OBJ1 after the reduction coincides with the second object OBJ2.

Also, in step S110 of FIG. 6, the object relation determination portion 103 executes geometric transformation processing that enlarges the first object OBJ1 by the scaling factor $e_2$, which is indicated by the geometric difference information on the second row in FIG. 12. In step S111, the object relation determination portion 103 compares the first object OBJ1 after the enlargement with the third object OBJ3 that is recognized in step S106. Then, in step S112, the object relation determination portion 103 determines, from the result of the comparison in step S111, whether or not the first object OBJ1 after the enlargement coincides with the third object OBJ3.

Then, if the determination result that the two objects do not coincide with each other is obtained in either step S109 or S112, the authenticity determination portion 105 determines that the optical variable image device 2 is a counterfeit. On the other hand, if the determination result that the two objects coincide with each other is obtained in step S112, the authenticity determination portion 105 determines that the optical variable image device 2 is genuine.

It should be noted that in the above-described examples, the case where the optical variable image device 2 is a device with which three objects are observed from the three observation directions exemplified in FIGS. 1A to 1C is used as an example. However, the inspection apparatus 100 of the present embodiment can also be configured so as to be capable of dealing with even the optical variable image device 2 with which four or more objects are observed from four or more observation directions. In this case, the inspection apparatus 100 images each of the reflected light rays corresponding to the four or more observation directions onto the area sensor 121 of the imaging portion 102 using the optical system portion 101. The imaging portion 102 generates reflected light images corresponding to the four or more respective reflected light rays. The memory portion 104 uses one object in the four or more reflected light images as a reference, and stores geometric difference information that indicates a geometric difference from the reference object for each of the other objects. With respect to each of the objects other than the reference, the object relation determination portion 103 applies a geometric transformation to the reference object in accordance with the geometric difference information and performs a comparison with the reference object after the geometric transformation. The authenticity determination portion 105 determines that the optical variable image device 2 is a counterfeit if at least one of the objects other than the reference does not coincide with the reference object after the geometric transformation. On the other hand, if each of the objects other than the reference coincides with the reference object after the geometric transformation, the authenticity determination portion 105 determines that the optical variable image device 2 is genuine.

It should be noted that the geometric difference between objects corresponding to different observation directions may also be represented by, for example, a combination of at least two of the rotation angle, the movement, and the size.

Second Embodiment

Subsequently, a second embodiment will be described. FIG. 13 shows an example of the configuration of the inspection apparatus 100 according to the second embodiment. In FIG. 13, the same portions as those in FIG. 3 are denoted by the same reference numerals, and descriptions thereof are omitted. Also, the optical variable image device 2 to be subjected to authenticity determination of the present embodiment may be the optical variable image device shown in FIGS. 2A to 2C, FIGS. 7A to 7C, or FIGS. 10A to 10C, for example, as in the case of the first embodiment.

The prism 111 shown in FIG. 3 is omitted from the optical system portion 101 shown in FIG. 13. In the optical system portion 101 having this configuration, only the second reflected light ray corresponding to the observation direction that is at the angle $+\alpha$ and passing through the prism 112 and the third reflected light ray corresponding to the observation direction that is at the angle $-\alpha$ and passing through the prism 113 are imaged by the area sensor 121 via the imaging lens 114. That is to say, in the present embodiment, the first reflected light ray corresponding to the vertical observation direction does not enter the imaging lens 114 and therefore is not imaged by the area sensor 121.

For this reason, when the optical variable image device 2 in FIGS. 2A to 2C is imaged by the area sensor 121 via the optical system portion 101, in the image P in FIG. 4, the first reflected light image P1 is not present, and only the second reflected light image P2 and the third reflected light image P3 are present in the same positional relationship.

As described above, the present embodiment is configured such that only the second reflected light image P2 and the third reflected light image P3 are obtained. In this case, in the optical system portion 101, only the second reflected light ray and the third reflected light ray pass through the imaging lens 114, and the second reflected light ray and the third reflected light ray pass through positions equidistant from the optical axis of the imaging lens 114. Thus, even if the imaging lens 114 is an ordinary lens that is not a telecentric lens, the images of the second reflected light ray and the third reflected light ray passing through the imaging lens 114 have the same size. Moreover, in this case, no reflected light ray passes through the optical axis of the imaging lens 114. Therefore, it is possible to use an ordinary lens as the imaging lens 114 of the present embodiment, rather than using a telecentric lens. It should be noted that in the case where the imaging lens 114 is an ordinary lens, the optical paths of the second reflected light ray and the third reflected light ray are refracted at the incidence on the imaging lens 114, cross each other within the imaging lens 114, and exit in this state, as shown in FIG. 13.

Next, the configuration of authenticity determination of the optical variable image device 2 that is performed by the inspection apparatus 100 according to the present embodiment will be described. As described above using FIG. 13, in the inspection apparatus 100 of the present embodiment, only the second reflected light image P2 and the third reflected light image P3 are generated. That is to say, the inspection apparatus 100 of the present embodiment does not use the first object OBJ1 in the first reflected light image P1 and uses only the second object OBJ2 in the second reflected light image P2 and the third object OBJ3 in the third reflected light image P3 to perform authenticity determination.

As described above, according to the present embodiment, the first object OBJ1 is not used for authenticity determination. However, it is difficult to produce a counterfeit of the optical variable image device 2 as elaborately as the genuine one. Therefore, it can be considered that there is almost no chance that a situation in which an object that is observed with respect to a counterfeit of the optical variable image device 2 cannot be distinguished from that of the genuine one occurs. For this reason, it is extremely unlikely that a counterfeit with which, for example, the second object OBJ2 and the third object OBJ3 are the same as those of the genuine optical variable image device 2, but only the first object OBJ1 is different from that of the genuine optical variable image device 2 is produced. Therefore, in the present embodiment, even though the first object OBJ1 is not used, sufficient reliability with regard to authenticity determination can be maintained.

FIG. 14 shows an example of the contents of geometric difference information that is stored in the memory portion 104 of the inspection apparatus 100 according to the present embodiment. The geometric difference information shown in FIG. 14 has the contents corresponding to the optical variable image device 2 in FIGS. 2A to 2C. In the geometric difference information in FIG. 14, the object correspondence relationship "#2:#3" is associated with the geometric difference "rotation:−2β". That is to say, the geometric difference information in FIG. 14 indicates that the geometric difference of the third object OBJ3 from the second object OBJ2 serving as a reference is a rotation by a rotation angle −2β.

A flowchart in FIG. 15 illustrates an example of a processing procedure that is executed by the inspection apparatus 100 of the present embodiment. In the inspection apparatus 100, the second reflected light image P2, of the second reflected light image P2 and the third reflected light image P3 that are generated by the imaging portion 102, is input to the object relation determination portion 103 (step S201).

Next, the object relation determination portion 103 recognizes the second object OBJ2 on the second reflected light image P2 that is input in step S201 (step S202).

Also, the third reflected light image P3, of the second reflected light image P2 and the third reflected light image P3 that are generated by the imaging portion 102, is input to the object relation determination portion 103 (step S203). The object relation determination portion 103 recognizes the third object OBJ3 from the third reflected light image P3 that is input in step S203 (step S204).

Next, the object relation determination portion 103 applies a geometric transformation to the second object OBJ2 in accordance with the geometric difference between the second object OBJ2 and the third object OBJ3 (step S205). As a specific example, the object relation determination portion 103 refers to the geometric difference information (FIG. 14) that is stored in the memory portion 104. As described above, the geometric difference information in FIG. 14 indicates that the geometric difference of the third object OBJ3 from the second object OBJ2 is a rotation by the rotation angle −2β. Thus, in step S205, the object relation determination portion 103 applies a geometric transformation that rotates the second object OBJ2 by the rotation angle −2β on the second reflected light image P2.

Next, the object relation determination portion 103 compares the second object OBJ2 after the geometric transformation in step S205 with the third object OBJ3 that is recognized in step S204 (step S206).

The object relation determination portion 103 determines, as a result of the comparison in step S206, whether or not the second object OBJ2 after the geometric transformation coincides with the third object OBJ3 (step S207).

If the second object OBJ2 after the geometric transformation does not coincide with the third object OBJ3 (step S207-NO), the authenticity determination portion 105 determines that the optical variable image device 2 is a counterfeit (step S209). On the other hand, if the second object OBJ2 after the geometric transformation coincides with the third object OBJ3 (step S207-YES), the authenticity determination portion 105 determines that the optical variable image device 2 is genuine (step S208).

With this configuration, the inspection apparatus 100 can perform authenticity determination of the optical variable image device 2 with which images corresponding to three or more observation directions are observable, using only the objects corresponding to a part of all of the observation directions.

Third Embodiment

Subsequently, a third embodiment will be described. In the third embodiment, the medium 1 is conveyed in a conveyance direction indicated by arrow A by a conveyance portion, which is not shown. As the medium 1 is conveyed, the relative positional relationship between the optical variable image device 2 provided on the medium 1 and the optical system portion 101 also changes with time in accordance with the conveyance direction. The inspection apparatus 100 according to the third embodiment is configured so as to be capable of generating reflected light images in response to the situation in which the relative positional relationship between the optical variable image device 2 and the optical system portion 101 changes as described above.

Figure 16:
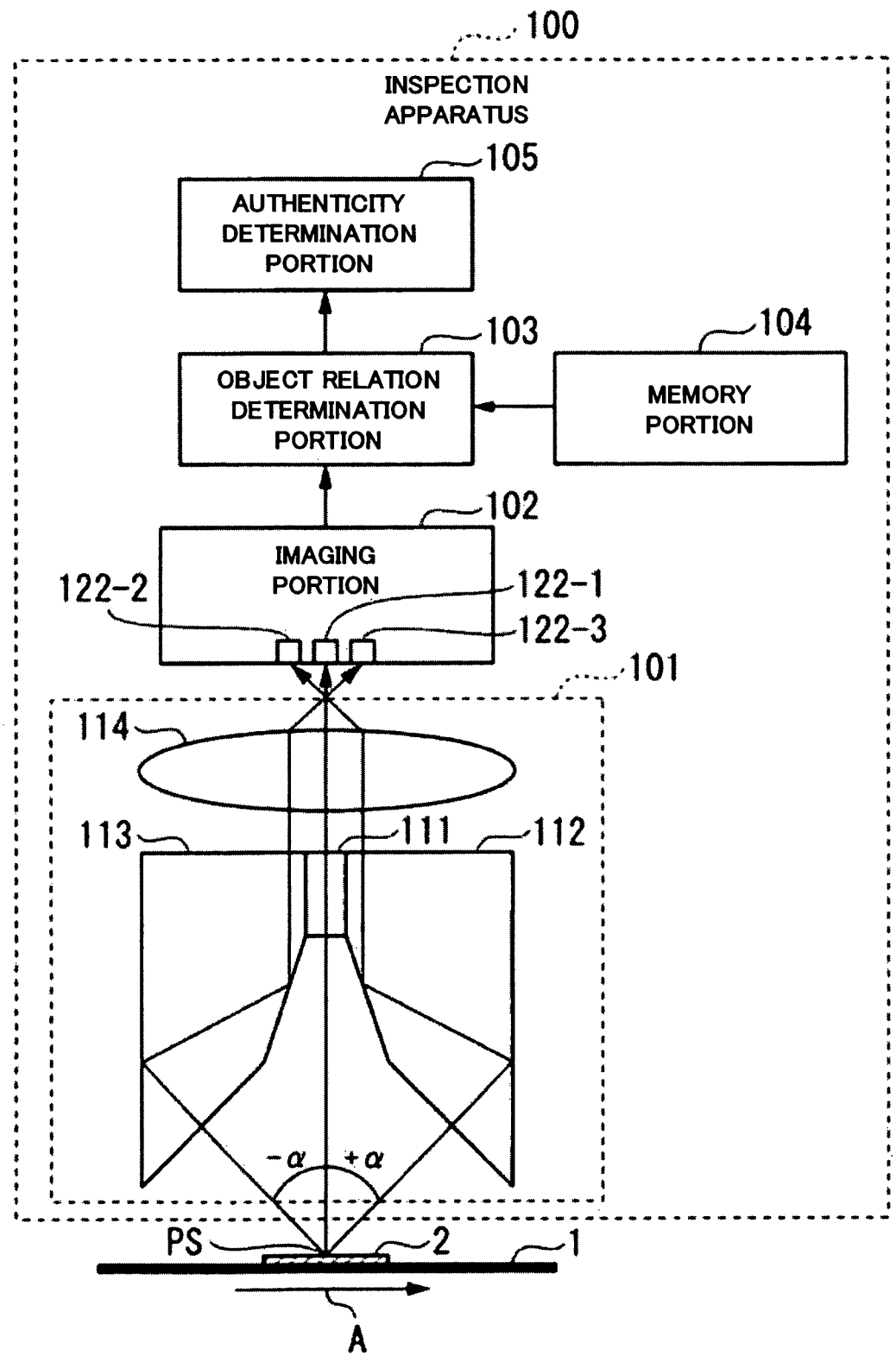
FIG. 16 is a diagram showing an example of the configuration of an inspection apparatus according to a third embodiment.

FIG. 16 shows an example of the configuration of the inspection apparatus 100 according to the present embodiment. In FIG. 16, the same portions as those in FIG. 3 are denoted by the same reference numerals, and descriptions thereof are omitted. The imaging portion 102 shown in FIG. 16 includes three line sensors 122-1, 122-2, and 122-3 instead of the area sensor 121 shown in FIG. 3. The line sensor 122-1 is a light-receiving portion that is formed by arranging pixels in a line. The line sensor 122-1 receives the first reflected light ray exiting the prism 111 and being imaged by the imaging lens 114. The line sensor 122-2 receives the second reflected light ray exiting the prism 112 and being imaged by the imaging lens 114. The line sensor 122-3 receives the third reflected light ray exiting the prism 113 and being imaged by the imaging lens 114. In this manner, the line sensors 122-1, 122-2, and 122-3 are provided so as to separately image a plurality of reflected light rays from the optical variable image device 2 that is moving in a given direction relative to the imaging portion 102, the plurality of reflected light rays corresponding to different observation directions.

Figure 17:
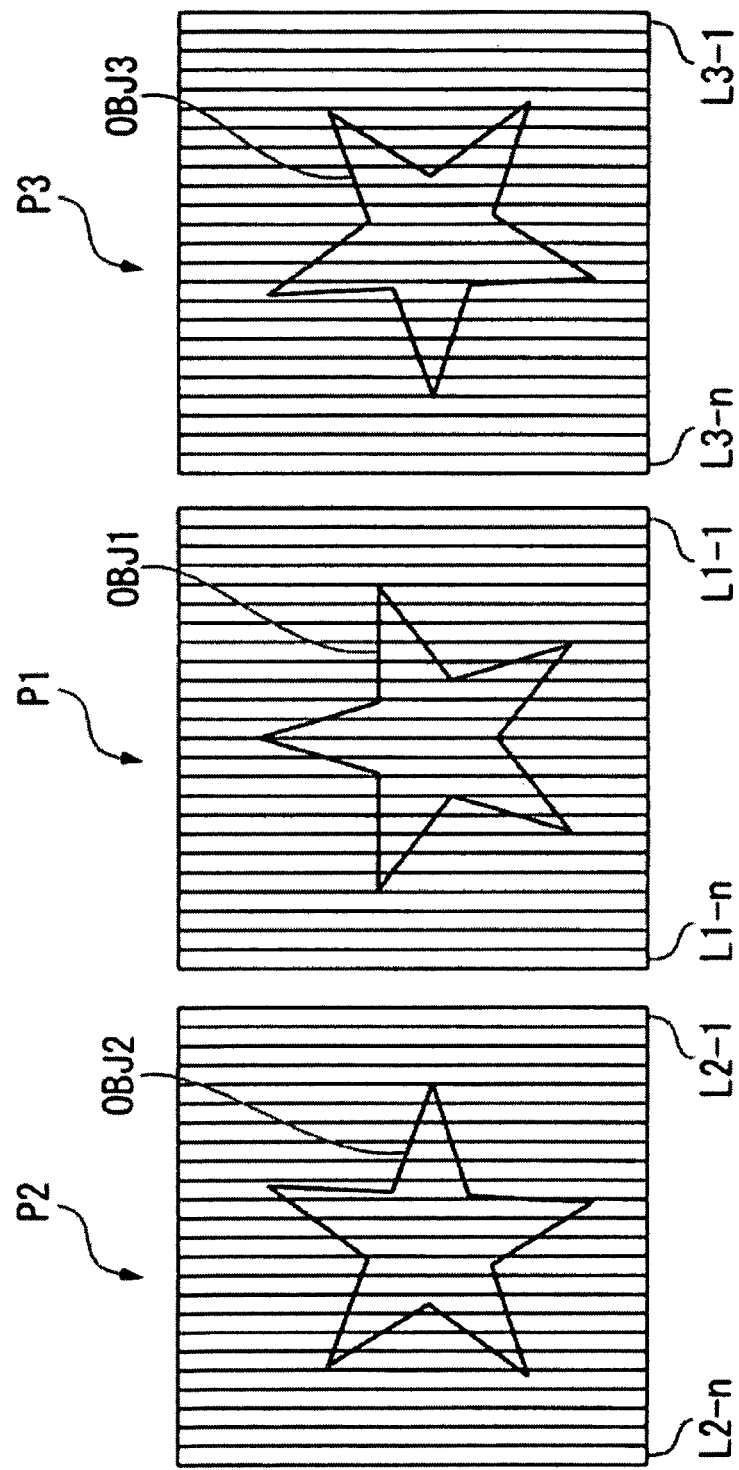
FIG. 17 shows an example of a reflected light image generating process that is performed by the inspection apparatus according to the third embodiment.

Referring to FIG. 17, the following is a description of an example of signal processing for generating reflected light images (first reflected light image P1, second reflected light image P2, and third reflected light image P3) that is performed by the imaging portion 102 of the present embodiment. It should be noted that in the description of FIG. 17, the case where, as the medium 1 is conveyed in the conveyance direction indicated by arrow A in FIG. 16, the optical variable image device 2, at an imaging position PS shown in FIG. 16, moves from the left to the right of FIGS. 17A to 17C is used as an example.

With the movement of the optical variable image device 2, the imaging portion 102 successively generates line-shaped line images L1-1 to L1-$n$ at regular time intervals from the first reflected light ray received by the line sensor 122-1. Also, the imaging portion 102, similarly in the state in which the optical variable image device 2 is moving, successively generates line images L2-1 to L2-$n$ at the same regular time intervals from the second reflected light ray received by the line sensor 122-2. Also, the imaging portion 102, similarly in the state in which the optical variable image device 2 is moving, successively generates line images L3-1 to L3-$n$ at the same regular time intervals from the third reflected light ray received by the line sensor 122-3.

Then, the imaging portion 102 generates the first reflected light image P1 by joining the line images L1-1 to L1-$n$ together in the horizontal direction as shown in FIG. 17. Also, the imaging portion 102 generates the second reflected light image P2 by joining the line images L2-1 to L2-$n$ together in the horizontal direction. Also, the imaging portion 102 generates the third reflected light image P3 by joining the line images L3-1 to L3-$n$ together in the horizontal direction.

In this manner, the inspection apparatus 100 of the present embodiment can generate reflected light images corresponding to different observation directions in the case where the position of the optical variable image device 2 at the imaging position PS changes in one direction with time. Thus, the inspection apparatus 100 of the present embodiment is capable of dealing with a configuration in which, for example, mediums 1 are successively conveyed by a belt conveyor or the like and can successively perform authenticity determination of the optical variable image devices 2 on the mediums 1. It should be noted that, conversely, a configuration may also be adopted in which, for example, a plurality of mediums 1 are arranged in a given direction, and the imaging portion 102 of the inspection apparatus 100 moves so as to successively image the optical variable image devices 2 on the mediums 1.

According to at least one of the embodiments described above, it is possible to provide an inspection apparatus that is configured to determine whether or not there is a predetermined geometric difference between objects contained in images that are imaged so as to correspond to a plurality of different observation directions with respect to the optical variable image device 2, and thus is capable of performing authenticity determination using a hologram without depending on the sense of sight of a person.

It should be noted that the processing of the above-described inspection apparatus 100 may also be performed by recording a program for realizing the functions of the above-described inspection apparatus 100 in a computer-readable recording medium and causing a computer system to load and execute the program recorded in the recording medium. Here, "causing a computer system to load and execute the program stored in the recording medium" includes installing the program on the computer system. The "computer system" as used herein is to be construed as including an OS and hardware such as peripheral equipment. Moreover, the "computer system" may also include a plurality of computer devices that are connected via a network including the Internet, a WAN, a LAN, and a communication line such as a dedicated line. Also, the "computer-readable recording medium" refers to a portable medium such as a flexible disk, a magneto-optical disk, a ROM, and a CD-ROM as well as a storage device, such as a hard disk, built into a computer system. As described above, the recording medium in which the program is stored may be a non-transient recording medium such as a CD-ROM. Moreover, the recording medium also includes an internal or external recording medium that is accessible from a distribution server in order to distribute the program. The code of the program that is stored in a recording medium of the distribution server may differ from the code of the program in a format that is executable by a terminal device. That is to say, the program may be stored in any format in the distribution server as long as the program can be downloaded from the distribution server and installed on the terminal device in an executable form. It should be noted that a configuration may also be adopted in which the program is divided into a plurality of portions, and those portions are combined together on a terminal device after being downloaded at different timings, and the portions into which the program is divided may be distributed separately by different distribution servers. Furthermore, the "computer-readable recording medium" is to be construed as including a recording medium that retains the program for a given period of time like a volatile memory (RAM) in a computer system serving as a server or a client in the case where the program is transmitted via a network. Also, the program may be a program for realizing a part of the above-described functions. Furthermore, the program may be a program, namely, a so-called differential file (differential program) that can realize the above-described functions when being combined with a program that has already been recorded in the computer system.

While certain embodiments have been described, these embodiments have been presented by way of example only, and are not intended to limit the scope of the invention. Indeed, these embodiments may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the inventions.

What is claimed is:

1. An inspection apparatus comprising:
an optical system portion on which a plurality of reflected light rays corresponding to a plurality of observation directions with respect to an optical variable image device are incident and which images the plurality of reflected light rays incident thereon;
an imaging portion that images the plurality of reflected light rays imaged by the optical system portion and thereby generates reflected light images corresponding to the plurality of respective observation directions;
an object relation determination portion that determines whether or not there is a predetermined geometric difference between objects that are contained in reflected light images imaged by the imaging portion and corresponding to different observation directions by applying a predetermined geometric transformation to at least one of a first object contained in a reflected light image corresponding to a first observation direction to obtain a first object transformation and a second object contained in a reflected light image corresponding to a second observation direction that is different from said first observation direction to determine a second object transformation, and then determines whether or not the first object and the second object coincide with each other by comparing the first and second object transformations, wherein the object relation determination portion moves at least one of the first object and the second object in a predetermined movement direction for a predetermined movement amount; and an authenticity determination portion that determines authenticity of the optical variable image device based on a result of the determination by the object relation determination portion.

2. The apparatus according to claim 1, wherein the object relation determination portion performs the determination of whether or not the first object and the second object coincide with each other after the application of the geometric transformation, using objects corresponding to a part of all of the observation directions.

3. The apparatus according to claim 1, wherein the object relation determination portion moves at least one of the first object and the second object by a predetermined rotation angle as the predetermined geometric transformation.

4. The apparatus according to claim 1, wherein the object relation determination portion enlarges or reduces at least one of the first object and the second object by a predetermined scaling factor as the predetermined geometric transformation.

5. The apparatus according to claim 1, wherein the imaging portion is configured to generate the reflected light images based on a light-receiving signal that is obtained by a reflected light ray imaged by the optical system portion being received by a light-receiving surface of an area sensor.

6. The apparatus according to claim 5, wherein the area sensor is provided such that reflected light rays corresponding to respective observation directions and imaged by the optical system portion are received by a light-receiving surface.

7. The apparatus according to claim 1, wherein the imaging portion is configured such that a plurality of line sensors are provided so as to separately image the plurality of reflected light rays from an optical variable image device that is moving in a given direction relative to the imaging portion, the plurality of reflected light rays corresponding to the respective observation directions, and reflected light images corresponding to the respective observation directions are generated by joining together line-shaped line images that are obtained based on light-receiving signals that are obtained by the plurality of line sensors.

8. The apparatus according to claim 7, further comprising a conveyance portion that conveys an optical variable image device in a given direction relative to the imaging portion.

* * * * *